United States Patent
Liao et al.

(10) Patent No.: US 8,050,341 B2
(45) Date of Patent: Nov. 1, 2011

(54) METHOD AND APPARATUS FOR ACQUIRING FREQUENCY OF MULTI-PATH SIGNAL

(75) Inventors: Xue-Jian Liao, Daya Township, Taichung County (TW); Kuo-Chuan Lin, Sinyuan Township, Pingtung County (TW)

(73) Assignee: Qisda Corporation, Taoyuan County (TW)

( * ) Notice: Subject to any disclaimer, the term of this patent is extended or adjusted under 35 U.S.C. 154(b) by 796 days.

(21) Appl. No.: 12/110,025

(22) Filed: Apr. 25, 2008

(65) Prior Publication Data

US 2008/0267305 A1    Oct. 30, 2008

(30) Foreign Application Priority Data

Apr. 27, 2007    (TW) ................................. 96114996 A (51) Int. Cl.
*H04L 27/28*    (2006.01)

(52) U.S. Cl. ....................................................... 375/260
(58) Field of Classification Search ................. 375/260, 375/267, 299, 347, 349; 700/53; 455/101, 455/132–141
See application file for complete search history.

(56) References Cited

U.S. PATENT DOCUMENTS

2006/0215778 A1* 9/2006 Murthy et al. ................ 375/260

* cited by examiner

*Primary Examiner* — Sam K Ahn (57) ABSTRACT

A method and an apparatus for acquiring a target frequency of a multi-path signal are disclosed. The multi-path signal includes a first path signal and a second path signal. First, the first path signal is received through a first path and the second path signal is received through a second path. Then, a target region is determined. The target region is a portion of a second cyclic prefix in the second path signal which overlaps with a first cyclic prefix in the first path signal. Afterward, the target frequency is determined based on the target region.

12 Claims, 6 Drawing Sheets

METHOD AND APPARATUS FOR ACQUIRING FREQUENCY OF MULTI-PATH SIGNAL

BACKGROUND OF THE INVENTION

1. Field of the Invention

The invention relates to a method and an apparatus for acquiring a target frequency, and more specifically, to a method and an apparatus for acquiring a target frequency of a multi-path signal.

2. Description of the Prior Art

The orthogonal frequency division multiplexing (OFDM) is a multi-path modulating/demodulating technology with high efficiency. The theorem is to use several sub-carrier waves to transmit the data concurrently to improve the data transmitting rate. As implied by the name, OFDM is used for dividing the available bandwidth into several narrow frequency bands to transmit data in parallel through these frequency bands. Due to the fact that the OFDM wireless communication system has advantages of: high data transmitting rate, high bandwidth using rate, and preventing the radio waves from the multi-path attenuation, the OFDM wireless communication system is widely applied to the new generation wireless communication system.

However, the OFDM technology has its drawbacks, such as a high peak-to-average power ratio and a high sensitivity to the frequency error of the sub-channel. Therefore, in the OFDM wireless communication system, how the frequency recovering can be performed to achieve the effect of frequency synchronization is a very important topic.

The conventional frequency synchronizing method for the multi-path signal is done by adding a cyclic prefix in front of the data sector in the signal. After the signal is received at the receiving end, the frequency/phase is estimated by using the cyclic prefix to obtain the synchronizing frequency. However, when the cyclic prefix is interfered, a serious error occurs in the frequency obtained by the phase estimation and causes a serious frequency departure.

Therefore, the main goal of the invention is to provide a method and an apparatus for acquiring a target frequency of a multi-path signal to solve the problems above.

SUMMARY OF THE INVENTION

A preferred embodiment according to the invention is a method for acquiring a target frequency of a multi-path signal. The multi-path signal includes a first path signal and a second path signal. Firstly, the first path signal is received through a first path and the second path signal is received through a second path. Then, a target region is determined. The target region is a portion of a second cyclic prefix in the second path signal, which overlaps with a first cyclic prefix in the first path signal. Afterward, the target frequency is determined according to the target region.

Another preferred embodiment according to the invention is an apparatus for acquiring a target frequency of a multi-path signal. The multi-path signal includes a first path signal and a second path signal. The apparatus includes a receiving module, a region determining module, and a frequency-determining module. The receiving module is used for receiving the first path signal through a first path and the second path signal through a second path. The region-determining module is used for determining a target region. The target region is a portion of a second cyclic prefix in the second path signal, which overlaps with a first cyclic prefix in the first path signal. The frequency-determining module is used for determining the target frequency according to the target region.

The advantage and spirit of the invention may be understood with the following recitations together with the appended drawings.

DETAILED DESCRIPTION OF THE INVENTION

Figure 1:
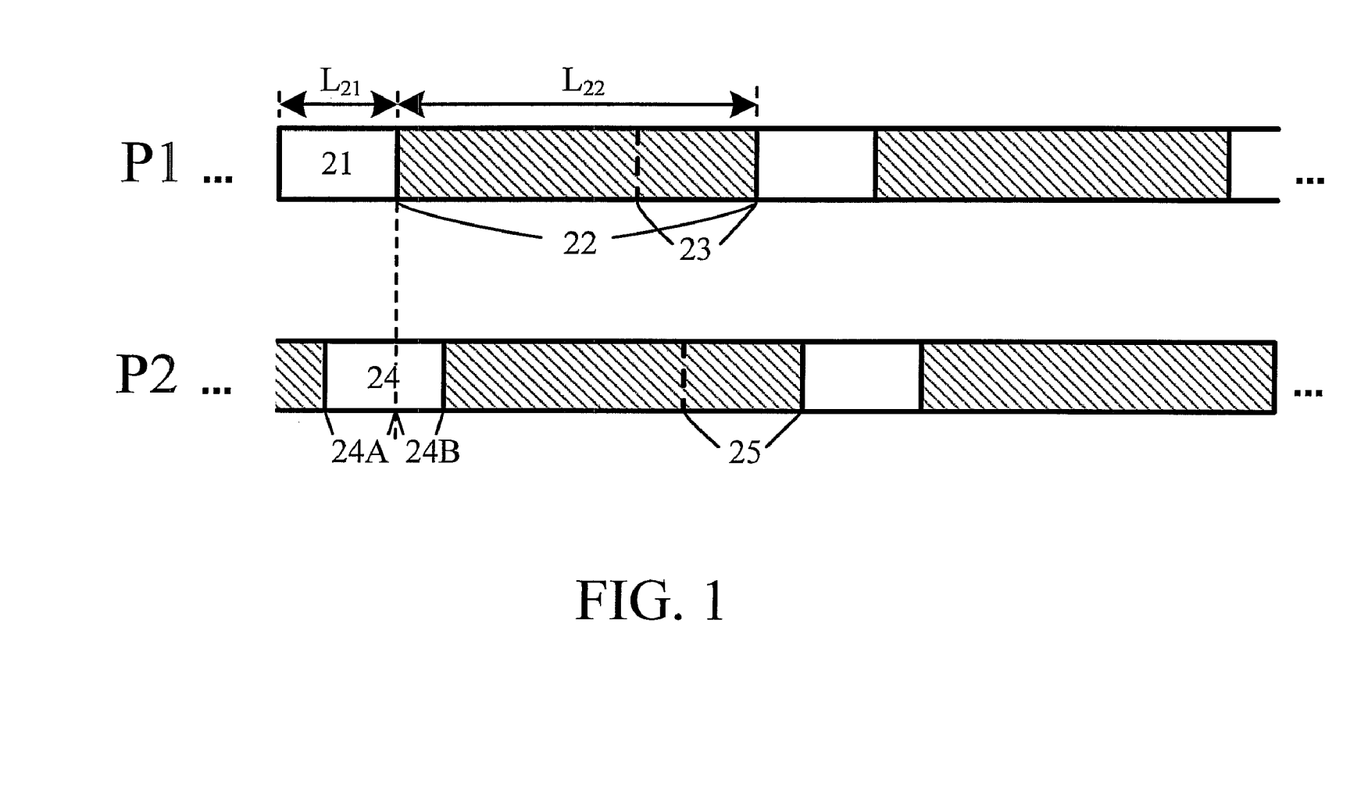
FIG. 1 is a schematic diagram of a first path signal and a second path signal included in a multi-path signal according to the prior art.

The invention provides a method and an apparatus for acquiring a target frequency of a multi-path signal. In practical applications, the multi-path signal can be an OFDM signal. Please refer to FIG. 1. The multi-path signal includes a first path signal P1 and a second path signal P2. Taking the OFDM signal for an example, a cyclic prefix 21 of the first path signal P1 is generated by copying a data sector 23 to data 22 in the first path signal P1. Therefore, the content included in the cyclic prefix 21 is the same with the data sector 23.

On the other hand, the main difference between the first path signal P1 and the second path signal P2 is the time the second path signal received by a receiving end. Since the first path signal P1 and the second path signal P2 are signals from the same emitter, the difference between them is generated from the effect of the multi-path signal. Therefore, a cyclic prefix 24 of the second path signal P2 is also the same with the cyclic prefix 21 of the first path signal P1. In the same manner, please refer to FIG. 3, the cyclic prefix 21 is the same with the data sector (a combination of 25A and 25B) of the second path signal P2. In addition, the data sector 25A is the same with the part marked 24A in the cyclic prefix 24. The data sector 25B is the same with the part marked 24B in the cyclic prefix 24.

Figure 3:
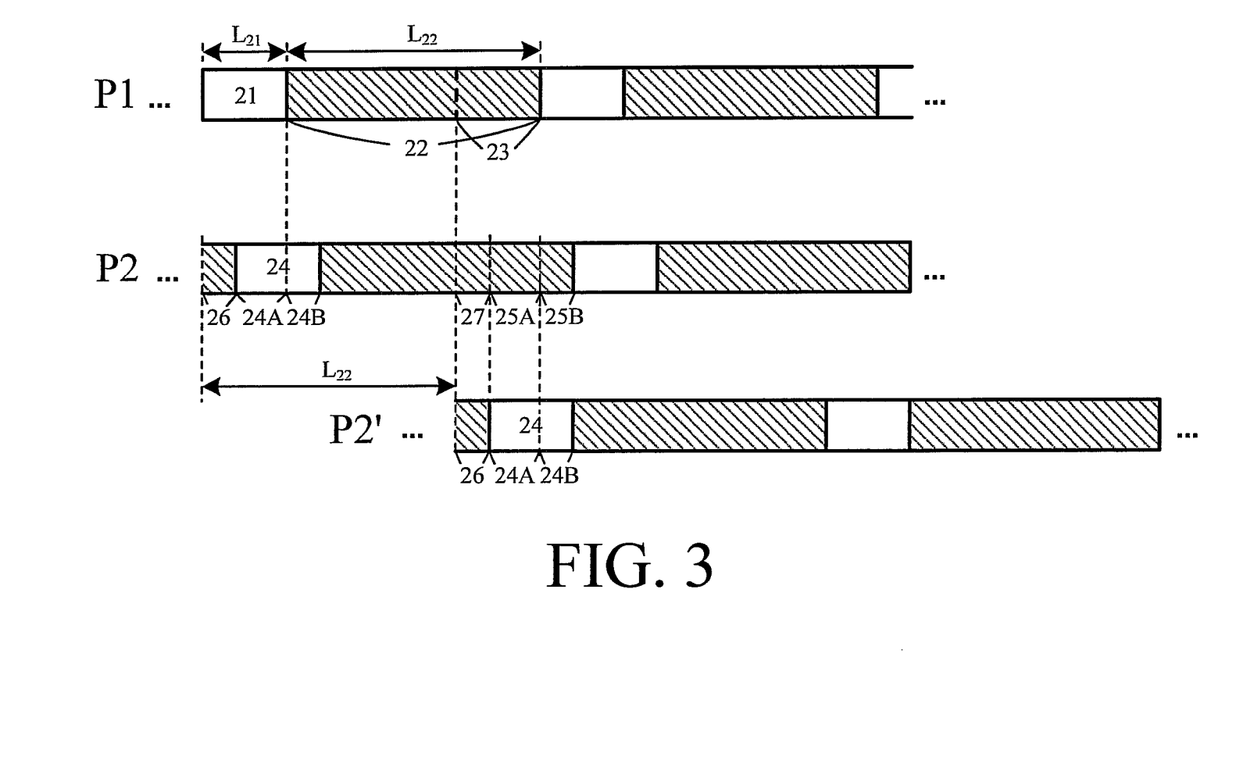
FIG. 3 shows an example of the first path signal, the second path signal, and the delayed second path signal.

Because the partial cyclic prefix 24B of the second path signal P2 has an overlap of time with the data 22 of the first path signal P1, the partial cyclic prefix 24B will be interfered by the data 22. If the frequency of the multi-path signal is directly estimated based on the cyclic prefix 24, there will be a serious error. Therefore, in the method and apparatus according to the invention, the non-interfered cyclic prefix sector (as the region marked 24A) is used as a target region, and the target region is used for further determining a target frequency of the multi-path signal.

Figure 2:
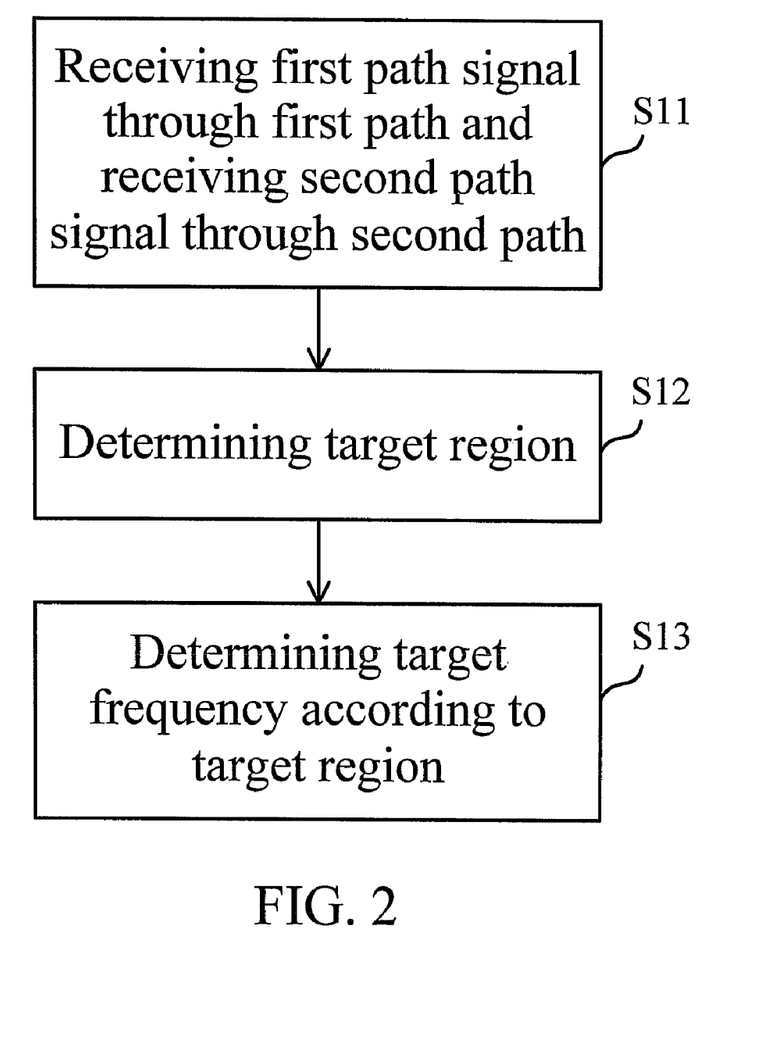
FIG. 2 is a flow diagram of the method for acquiring a target frequency of a multi-path signal in the first preferred embodiment according to the invention.

A preferred embodiment of the invention is a method for acquiring a target frequency of a multi-path signal. Please refer to FIG. 2. FIG. 2 is a flow diagram of the method. As shown in FIG. 2, firstly, step S11 is performed, the first path signal is received through a first path and the second path signal is received through a second path. Then, the step S12 is performed, a target region is determined. The target region is a portion of a second cyclic prefix in the second path signal, which overlaps with a first cyclic prefix line fist path signal. Afterward, step S13 is performed, the target frequency is determined according to the target region. The target frequency is capable of being determined by a clock recovery process performed on the target region.

In practical applications, according to the method in the invention, the second path signal P2 can be delayed to generate a delayed second path signal P2', and the target region can be found out by comparing the second path signal P2 and the delayed second path signal P2'. Please refer to FIG. 3. FIG. 3 shows an example of the first path signal P1, the second path signal P2 and the delayed second path signal P2'.

In the example shown in FIG. 3, the delayed second path signal P2' is generated by delaying the second path signal P2 with the length $L_{22}$ of the data 22. According to the invention, the combination of a data sector 26 and the target region 24A in the second path signal P2 can be seen as a first region; the combination of a data sector 27 and the target region 25A can be seen as a second region. As shown in FIG. 3, in the time domain, the data sector 26 in the delayed second path signal P2' overlaps with the data sector 27 in the second path signal P2. The target region 24A in the delayed second path signal P2' overlaps with the data sector 25A in the second path signal P2. In other words, the first region in the delayed second path signal P2' overlaps with the second region in the second path signal P2.

According to the method of the invention, the difference between the first region and the second region can be calculated to generate a differential signal. As mentioned above, the contents of the data sector 25A and the target region 24A are the same. Therefore, the part corresponding to the data sector 25A (namely, corresponding to the target region 24A) in the differential signal should be substantially equal to 0. Relatively, the data sector 26 in the first region is not necessarily related to the data sector 27 in the second region. Therefore, the part corresponding to the data sector 26 (namely, corresponding to the data sector 27) in the differential signal will not be equal to 0. By judging from the signal energy to see which sector in the differential signal is close to 0, the position of target region 24A can be found from the differential signal by the method of the invention.

As shown in FIG. 3, the lengths of the first region, the second region, and the differential signal are all substantially equal to the length $L_{21}$, of the cyclic prefix 21.

Figure 4:
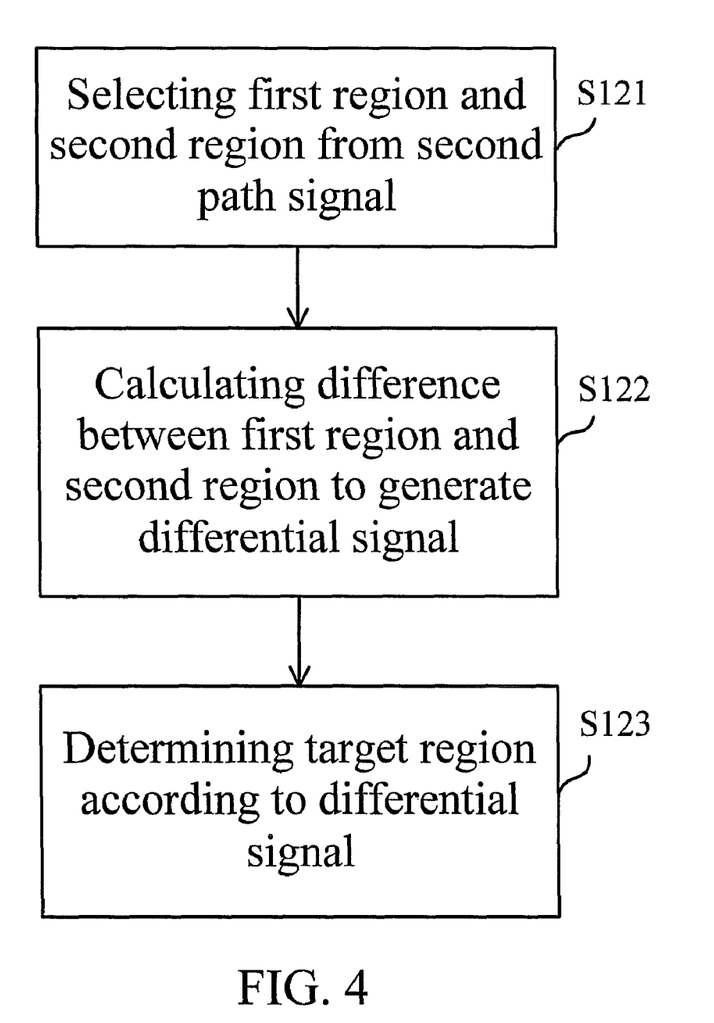
FIG. 4 shows the step S12 which further includes the sub-steps S121 to S123.

As shown in FIG. 4, the step S12 in FIG. 2 can include the sub-steps S121 through S123. The sub-step S121 is to select a first region and a second region from the second path signal. The first region includes the target region, and the second region includes an original region corresponding to the target region. The sub-step S122 is to calculate the difference between the first region and the second region to generate a differential signal. The sub-step S123 is to determine the target region according to the differential signal. The signal energy of the target region is smaller than a predetermined value.

In practical applications, the sub-step S122 can firstly calculate a set of first amplitudes in the first region and a set of second amplitudes in the second region. Then, the set of first amplitudes is subtracted from the set of second amplitudes to generate the differential signal.

In order to further define the range of the target region 24A from the differential signal, the differential signal can be set as a default region by the method of the invention. The default region can be further divided into a first sub-region and a second sub-region, and the total energies of the first sub-region and the second sub-region are compared. If the total energy of the first sub-region is larger than the total energy of the second sub-region and the energy difference is larger than an energy threshold, that is to say, when the signal strength of the first sub-region is much stronger than that of the second sub-region, the first sub-region with larger signal strength is set as the default region again. And, the steps above are repeated to divide the first sub-region into two sub-regions and their total energies are compared. The process is continued in this way until the energy difference between the two divided sub-regions is smaller than an energy threshold. At this time, the signal strengths of the two sub-regions are quite close. The part corresponding to the data sector 26 (namely, corresponding to the data sector 27) in the differential signal can be obtained by combining the two sub-regions. The range of the target region 24A can be defined from the part corresponding to the data sector 26 in the differential signal.

Figure 5:
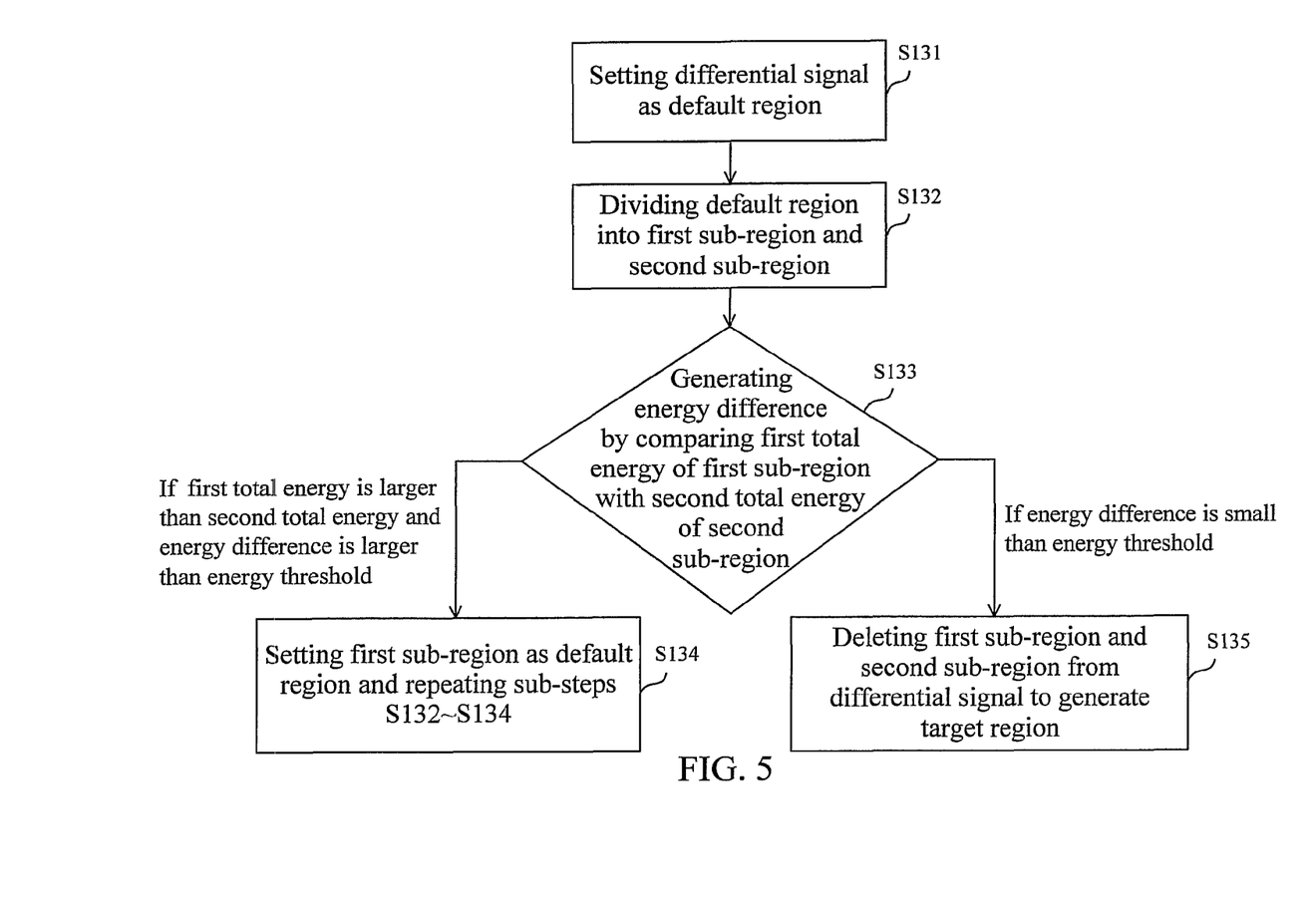
FIG. 5 shows the step S13 which further includes the sub-steps S131 to S135.

As shown in FIG. 5, the above-mentioned step S13 can be divided into the sub-steps S131 through S135. The sub-step S131 is to set the differential signal as a default region. The sub-step S132 is to divide the default region into a first sub-region and a second sub-region. The sub-step S133 is to generate an energy difference by comparing a first total energy of the first sub-region with a second total energy of the second sub-region. If the first total energy is larger than the second total energy and the energy difference is larger than an energy threshold, the sub-step S134 is performed to set the first sub-region as the default region and the sub-steps S132 through S134 are repeated. If the energy difference is smaller than the energy threshold, the sub-step S135 is performed to delete the first sub-region and the second sub-region from the differential signal to generate the target region.

Figure 6:
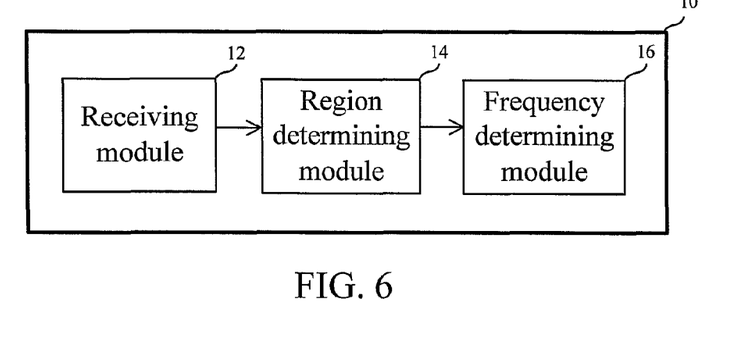
FIG. 6 is a functional block diagram of the frequency-acquiring apparatus in the second preferred embodiment of the invention.

The second preferred embodiment of the invention is an apparatus for acquiring a target frequency of a multi-path signal. The multi-path signal includes a first path signal and a second path signal. Please refer to FIG. 6. FIG. 6 is a functional block diagram of the frequency acquiring apparatus. As shown in FIG. 6, the frequency-acquiring apparatus 10 includes a receiving module 12, a region determining module 14, and a frequency-determining module 16. The receiving module 12 is used for receiving the first path signal through a first path and the second path signal through a second path. The region-determining module 14 is used for determining a target region. The target region is a portion of a second cyclic prefix in the second path signal, which overlaps with a first cyclic prefix in the first path signal. The second cyclic prefix has a prefix length and the length of the differential signal is substantially equal to the prefix length. The frequency-determining module 16 is used for determining the target frequency according to the target region. The target frequency can be determined by a clock recovery process performed on the target region.

Figure 7:
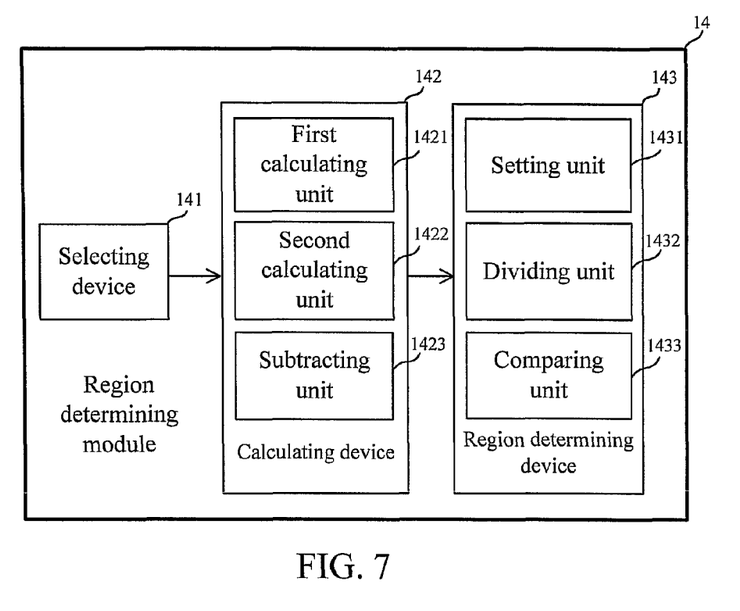
FIG. 7 is a detailed functional block diagram of the region-determining module shown in FIG. 6.

As shown in FIG. 7, in practical applications, the region-determining module 14 can include a selecting device 141, a calculating device 142, and a region-determining device 143. The selecting device 141 is used for selecting a first region and a second region from the second path signal. The first region includes the target region, and the second region includes an original region corresponding to the target region. The calculating device 142 is electrically connected to the selecting device 141 and used for calculating the difference between the first region and the second region to generate a differential signal. The region-determining device 143 is used for determining the target region according to the differential signal, wherein the signal energy of the target region is smaller than a predetermined value.

In addition, as shown in FIG. 7, the calculating device 142 can include a first calculating unit 1421, a second calculating unit 1422, and a subtracting unit 1423. The first calculating unit 1421 is used for calculating a set of first amplitudes in the first region. The second calculating unit 1422 is used for calculating a set of second amplitudes in the second region. The subtracting unit 1423 is electrically connected to the first calculating unit 1421 and the second calculating unit 1422, which are used for generating the differential signal by subtracting the set of first amplitudes from the set of second amplitudes.

FIG. 7 also shows that the region-determining device 143 can include a setting unit 1431, a dividing unit 1432, and a comparing unit 1433. The setting unit 1431 is used for setting the differential signal as a default region. The dividing unit 1432 is electrically connected to the setting unit 1431, and used for dividing the default region into a first sub-region and a second sub-region. The comparing unit 1433 is used for generating an energy difference by comparing a first total energy of the first sub-region with a second total energy of the second sub-region. If the compared result from the comparing unit 1433 shows that the first total energy is larger than the second total energy and the energy difference is larger than an energy threshold, the setting unit 1431 will set the first sub-region as the default region, and the dividing unit 1432, as well as the comparing unit 1433, are re-operated. If the energy difference is smaller than the energy threshold, the setting unit 1431 will combine the first sub-region and the second sub-region to generate the target region.

Compared with the prior art, applying the method and the apparatus of the invention on a multi-path signal (e.g., an OFDM signal) can prevent the interfered cyclic prefix from being used and causes a serious error in the estimated frequency. Therefore, with the method and the apparatus for acquiring a target frequency of a multi-path signal, excellent effect of frequency synchronization can be achieved in a multi-path wireless communication system (e.g., an OFDM wireless communication system).

With the above example and explanation, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method for acquiring a target frequency of a multi-path signal, the multi-path signal comprising a first path signal and a second path signal, the method comprising the steps of:
   (a) an apparatus receiving the first path signal through a first path and receiving the second path signal through a second path;
   (b) the apparatus determining a target region, the target region being a portion of a second cyclic prefix in the second path signal and overlapping with a first cyclic prefix in the first path signal; and
   (c) the apparatus determining the target frequency according to the target region;
   wherein the step (b) is performed by the steps of:
   (b1) the apparatus selecting a first region and a second region from the second path signal, the first region comprises the target region, and the second region comprises an original region corresponding to the target region;
   (b2) the apparatus calculating the difference between the first region and the second region to generate a differential signal; and
   (b3) the apparatus determining the target region according to the differential signal, wherein a signal energy of the target region is small than a predetermined value.

2. The method of claim 1, wherein the step (b2) is performed by the steps of:
   calculating a set of first amplitudes in the first region;
   calculating a set of second amplitudes in the second region; and
   subtracting the set of first amplitudes from the set of second amplitudes to generate the differential signal.

3. The method of claim 1, wherein the second cyclic prefix has a prefix length and the length of the differential signal is substantially equal to the prefix length.

4. The method of claim 1, wherein the step (b3) is performed by the steps of:
   (b31) setting the differential signal as a default region;
   (b32) dividing the default region into a first sub-region and a second sub-region;
   (b33) generating an energy difference by comparing a first total energy of the first sub-region with a second total energy of the second sub-region;
   (b34) if the first total energy is larger than the second total energy and the energy difference is larger than an energy threshold, setting the first sub-region as the default region and repeating the sub-steps (b32)~(b34); and
   (b35) if the energy difference is smaller than the energy threshold, deleting the first sub-region and the second sub-region from the differential signal to generate the target region.

5. The method of claim 1, wherein in the step (c), the target frequency is determined by a pulse recovering process performed toward the target region.

6. The method of claim 1, wherein the multi-path signal is an orthogonal frequency division multiplexing signal.

7. An apparatus for acquiring a target frequency of a multi-path signal, the multi-path signal comprising a first path signal and a second path signal, the apparatus comprising:
   a receiving module for receiving the first path signal through a first path, and the second path signal through a second path;
   a region determining module for determining a target region, the target region being a portion of a second cyclic prefix in the second path signal which overlapping with a first cyclic prefix in the first path signal; and
   a frequency determining module for determining the target frequency according to the target region;
   wherein the region determining module comprises:
   a selecting device for selecting a first region and a second region from the second path signal, the first region comprises the target region, and the second region comprises an original region corresponding to the target region;
   a calculating device for calculating the difference between the first region and the second region to generate a differential signal; and
   a region determining device for determining the target region according to the differential signal, wherein a signal energy of the target region is smaller than a predetermined value.

8. The apparatus of claim 7, wherein the calculating device comprises:
   a first calculating unit for calculating a set of first amplitudes in the first region;
   a second calculating unit for calculating a set of second amplitudes in the second region; and
   a subtracting unit for generating the differential signal by subtracting the set of first amplitudes from the set of second amplitudes.

9. The apparatus of claim 7, wherein the second cyclic prefix has a prefix length and the length of the differential signal is substantially equal to the prefix length.

10. The apparatus of claim 7, wherein the region determining device comprises:
- a setting unit for setting the differential signal as a default region;
- a dividing unit for dividing the default region into a first sub-region and a second sub-region; and
- a comparing unit for generating an energy difference by comparing a first total energy of the first sub-region and a second total energy of the second sub-region;

wherein if the first total energy is larger than the second total energy and the energy difference is larger than an energy threshold, the setting unit sets the first sub-region as the default region, the dividing unit and the comparing unit are operated, if the energy difference is smaller than the energy threshold, deleting the first sub-region and the second sub-region from the differential signal to generate the target region.

11. The apparatus of claim 7, wherein in the frequency-determining module, the target frequency is determined by a clock recovery process performed to the target region.

12. The apparatus of claim 7, wherein the multi-path signal is an orthogonal frequency division multiplexing signal.

* * * * *